United States Patent Office 3,056,072
Patented Sept. 25, 1962

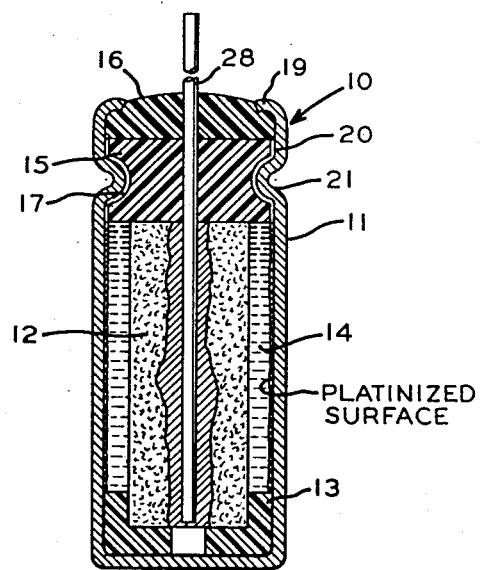
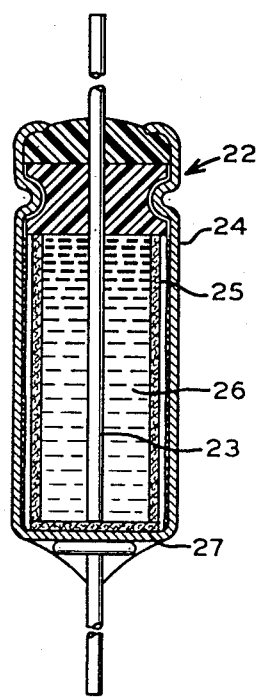
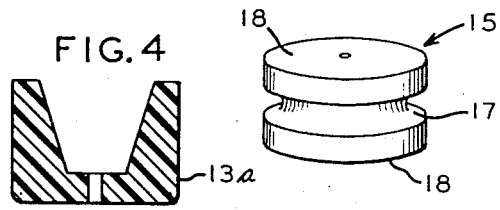
WALTER W. SCHROEDER
DAVID B. PECK
INVENTORS

3,056,072
TANTALUM CAPACITOR
Walter W. Schroeder and David B. Peck, Williamstown, Mass., assignors to Sprague Electric Company, North Adams, Mass., a corporation of Massachusetts
Filed June 26, 1958, Ser. No. 744,723
2 Claims. (Cl. 317—230)

This invention relates to a tantalum anode electrolytic capacitor and more particularly to a tantalum electrolytic capacitor with a seal closing a capacitor container to a film-forming electrolyte.

In tantalum anode capacitors there is employed the combination of a corrosive film-forming electrolyte in a silver cathode can. The film-forming electrolyte must be contained within the cathode can by a suitable plugging means. In such a capacitor construction the retention of the corrosive film-forming electrolyte within the cathode can is a problem complicated by the properties of the can and the need of a satisfactory plug which closes the open end of the can. An electrolytic capacitor having an oxide coated tantalum anode preferably is made up of the anode in a silver cathode can which also contains a corrosive oxide film-forming electrolyte. Such a combination, however, is difficult to assemble into a reliably sealed construction. Heat cycling of the assembled can requires the accommodation of the seal to the disparity between the can and the plug upon expansion and contraction. The seal must be maintained during this heat cycling.

A tantalum anode made up of particles of tantalum sintered into a dense pellet is subject to variations in dimensions when the pellets are reproduced in quantity. Such pellets of varying length must be securely mounted within a standard-size cathode can. The accommodation of variously sized pellets requires adaptability in the capacitor construction. A seal of the electrolytic capacitor must show low weight loss of the electrolyte, over a normal commercial range of operating temperatures for the capacitor. Also the seal must resist infiltration of foreign substances into the capacitor over a range of temperatures. To close the containing can of a tantalum anode capacitor and to form an end seal, it has been proposed to employ a material which is a good vapor barrier and is rigid enough to support a rolled-in crimp of the can wall. Polymerized tetrafluoroethylene, otherwise identified as Teflon, a product of the Dupont Company of Wilmington, Delaware, is an inert substance from which a structurally strong product can be formed. Teflon has been found to be a satisfactory vapor barrier and is also structurally rigid. However, the properties of Teflon are not entirely compatible with those of the silver cathode can of a tantalum capacitor in providing a tightly sealed end closure.

Because Teflon has cold-flow properties, working of the silver can wall into engagement with the Teflon frequently results in a slight deformation of the Teflon. This slight deformation of the Teflon becomes of extreme importance during heat cycling of the capacitor, in that silver and Teflon have markedly different temperature coefficients of expansion. Thus, while cold working of the silver can into engagement with the Teflon provides an adequate seal at room temperature, the permanent set taken by the slight deformation of the Teflon provides a path for the flow of electrolyte at elevated temperatures, where silver expands more than Teflon.

To provide a satisfactory locking interengagement between the capacitor can and the sealing plug, it is most desirable to form an indentation of the can into the plug. To effect this interengagement, the metal of the can must be formed after the insertion of the plug into the open can end. The inelasticity of the Teflon material does not lend itself to a working of the silver metal of the can into the plug. Therefore, it has been found advantageous to pre-cut a groove in the lateral wall of the Teflon plug. The interengagement then takes place by working a portion of the can wall into this suitable prepared groove or recess in the plug. The ductility of the silver can is reduced in proportion to the degree of working required to effect interengagement of the silver and the plug. Overworking of the silver metal causes cracks and a permanent impairment of the quality of the metal. In interengaging the can and plug, the can metal is coldworked (below the annealing temperature) with the result of a loss in ductility. Hence, the silver wall of the can cannot be worked into a tightly sealed relationship with the Teflon plug by forcing the silver to bite into the Teflon without causing objectionable embrittlement of the silver.

The silver wall of the cathode can will become embrittled and will crack under excessive working. Teflon, on the other hand, has poor flowing properties as compared to the silver wall and does not depart greatly from the permanent shape into which it is cut. Further, the silver can wall expands and contracts under heat cycling and to a greater extent than does the Teflon plug, as pointed out above. As a result the heat cycling of the capacitor results in a variable disparity between the plug and the silver can tending to create a passage between the inner surface of the silver can and the outer surface of the Teflon plug.

In a tantalum anode capacitor in which the anode is a pellet of sintered tantalum particles it is important that the pellet be maintained in position, centered in the capacitor can and supported against rotation and twisting. Further, the pellet must be mounted with satisfactory resistance to shock.

It is an object of this invention to provide a seal for a tantalum electrolytic capacitor over a range of temperatures and including low temperatures.

It is another object of this invention to provide in a silver cathode can of a tantalum capacitor a seal which can be formed in the assembly of a capacitor with a high degree of reliability.

It is still a further object of this invention to provide a tantalum electrolytic capacitor having a tantalum pellet anode in which the seal and other parts of the capacitor cooperate, hold and protect the pellet anode in the capacitor can.

These and other objects of this invention will become more apparent upon consideration of the following description taken together with the drawings in which:

FIG. 1 is a vertical sectional view of a tantalum electrolytic capacitor according to the present invention;

FIG. 2 is a perspective view of an end plug of this invention;

FIG. 3 is a vertical sectional view of a modified form of a tantalum electrolytic capacitor according to this invention; and FIGS. 4 and 5 are vertical sectional views showing two respective forms of spacer.

In general, this invention provides a tantalum electrolytic capacitor construction in which a plugging means including a plug of polytetrafluoroethylene is mounted in and adapted to the problems and needs of an electrolytic capacitor having a tantalum anode.

In this invention the capacitor end is sealed by a plugging means which includes a plug and a soft adhesive around the plug. The plug and can are held in engagement by a formed portion of the metal can with the non-solid adhesive attached to both the plug and the can throughout the heat cycling to which the capacitor is subjected and even at low temperatures. The resultant seal is adapted to operate despite the expansion and contraction of the can. The adhesive is a tacky substance which remains in a soft condition between the plug and the can and out of contact with the air. The tacky, soft, non-solid adhesive adheres both to the plug of Teflon and to the can of silver throughout the various stages of use. The layer of tacky adhesive is thin as it extends as a coating common to the plug and the inner wall of the can adjacent the plug. At the same time the tacky adhesive of this thin coating exhibits the ability to remain adherent to both surfaces. This may be described as tooth or bite of the adhesive on the adhered to surfaces.

A tantalum electrolytic capacitor may have an anode formed as a pellet. The pellet is made up from tantalum particles and coalesced into a dense porous structure. This pellet anode is mounted within a capacitor can and suitably held in position therein. The manufacture of the tantalum pellet anodes from tantalum particles does not produce pellets of consistently uniform dimension. The successive tantalum pellet anodes of fine particles when put together are subject to variations, particularly in length. Some forms of tantalum powder provide pellet anodes of more consistently reproducible dimensions. However, the construction of the electrolytic capacitor must accommodate the normal variation in anode dimensioning. According to this invention the capacitor structure cooperates with normal variations in pellet size to result in a satisfactorily reproducible device.

In FIG. 1 the capacitor 10 has a silver can 11 containing a tantalum anode 12. The tantalum anode is composed of sintered particles and has a density of approximately one-half the density of tantalum metal. Variation in the size and shape of the tantalum particles tends to result in variation in the reproduced pellets made of tantalum particles. The variation in pellet dimension is generally the result of shrinkage that occurs in the sintering of the pellets. The shape and size of the tantalum powder particles is subject to variation. Generally speaking, in the sintering operation the particles having the more irregular outline make smaller pellets for a given quantity of powder. These smaller pellets made from the powder of irregular particle outline are more apt to be reproducibly uniform. That is, the pellets made from the powder of relatively irregular particles show less deviation from a standard size. On the other hand, particles having a more regular outline form larger pellets for the same quantity of powder, and the pellets are subject to greater dimensional variation than those composed of irregular particles. This dimensional variation means that pellets of different lengths need to be accommodated within the capacitor construction. Pellets which are too long are subject to pressure and the danger of cracking. On the other hand, pellets which are too short may not be adequately secured in place in the capacitor can.

The tantalum anode pellet is both positioned and secured in the capacitor can. This positioning and securing preferably results in a construction in which the anode pellet will not twist or rotate and will also be supported against shock. To achieve this result the anode mounting in the capacitor can preferably includes a clamping action involving the top plug 15.

The anode 12 is extended into the can 11 to sit on a spacer 13 and to be immersed in an electrolyte 14 which is contained in the can 11 and surrounds and permeates the porous anode 12. The porous anode 12 has a porous surface as indicated in the drawing. The electrolyte enters the anode 12 through this porous surface. The silver can is platinized on its inner surface to increase its apparent surface, as described in the copending U.S. patent application Serial No. 354,814 filed May 13, 1953. A plug 15 of a suitable material, such as Teflon, is fitted in the open end of the anode 12. The plugging means for the open end of the can 11 also includes a wafer gasket 16 of a more resilient elastomeric substance than the Teflon of plug 15. It is the function of wafer gasket 16 to resiliently fill the space in the mouth of the capacitor can, and to thereby provide a more efficient seal during temperature cycling than could be obtained with a seal of silver and relatively inelastic Teflon alone. That is to say, wafer gasket 16 has sufficient elasticity to substantially maintain engagement with the can wall and riser even though high temperature cycling of the unit has opened a pathway between the Teflon plug and the silver can wall. A suitable material for wafer 16 is a fully saturated copolymer of chlorotrifluoroethylene and vinylidene fluoride (containing more than 50% fluorine by weight) known as Kel-F Elastomer and manufactured by Minnesota Mining and Manufacturing Company of Minneapolis, Minnesota.

The plug 15 is shown in a perspective view of FIG. 2. It has a short cylindrical shape with flat horizontal upper and lower surfaces 18. A groove 17 is cut around the middle of the plug 15 extending inwardly of the plug appreciably from the vertical lateral surface. This groove 17 is formed in the plug before it is assembled into the silver can 11. A layer 20 of a soft tacky adhesive lies between the plug 15 and the can 11, as shown in FIG. 1. In the assembly of the capacitor 10 the can is filled with the suitable film-forming electrolyte 14 and the anode 12 and plug 15 are positioned in the can 11. The adhesive layer 20 is applied and positioned to adhere to the plug 15 and the intersurface of the wall of the can 11 adjacent the plug 15 and particularly to the groove 17.

After the plug 15 is positioned in the can 11 the wafer gasket 16 is superimposed on the plug 15 in the can 11. The plug 15 and the gasket 16 are then secured in the can 11 by a forming of the can wall. The upper rim of the can 11 is spun over on the gasket 16 to form a lip 19 which holds the gasket 16 and the plug 15 in the can 11 against the anode 12. This seats the anode 12 in and against the spacer 13. Then the side wall of the can 11 is worked by suitable means such as rolling to indent a crimp 21 into the formed groove in the plug 15.

The pellet anode 12 is mounted in the capacitor can 11 under compression to better withstand shock and twisting. This mounting is assisted by the spacer 13 at the bottom of the can which supports the anode 12. The spacer 13, as shown in FIG. 1, is in the form of a cup. This cup may be of resilient material. For example, the spacer 13 may be of a suitable elastomer such as the Kel-F, polytrifluorochloroethylene or hypalon, a sulfurized polyethylene polymer manufactured by The Dupont Company of Wilmington, Delaware. This spacer made of such an elastomer has resiliency which assists in the coaction of the spacer of the Teflon plug and the adhesive layer in accommodating the possible variations in length of the pellet anode and holding the pellet anode against rotation. In addition, the cup shape spacer may be provided with a tapered seat in the form of spacer 13a shown in FIG. 4 or with a spring bottom as shown in spacer 13b of FIG. 5. The anode 12 is seated against these cup spacers in the same manner as is shown in FIG. 1.

The Teflon plug 15 forms a good vapor barrier in the end of the can 11 serving to retain the electrolyte from escape. The Teflon plug is also stiff and rigid under the forming of the crimp 21 into the groove 17. In combination with the plug 15 in the end of the can 11 flexibility is provided by the Kel-F gasket 16 and the tacky soft adhesive layer 20. The elastomeric seal expands and contracts to accommodate heat cycling. The adhesive layer 20 fills the groove area and is the plugging means at that point. Similarly, the Kel-F gasket 16 gives under the pressure of the rolled-over lip 19. The adhesive layer 20 and the Kel-F gasket 16 have similar functions and complete the seal of the end of the can to give low weight loss from the can and resistance to infiltration into the can. With this seal supplementing the closing of the can by the plug 15 it is not necessary for the wall of the can 11 to conform in complete contiguity with the groove 17.

The electrolyte has an acid pH and thus serves to preserve the tantalum oxide dielectric film on the anode. The Teflon plug in contact with this electrolyte is surrounded by the soft tacky adhesive layer 20 which holds the plug to the can and the electrolyte in the can. The tacky adhesive of layer 20 is a material which will remain permanently sticky and tacky when excluded from air.

This soft tacky adhesive is highly impermeable to gases and flexible at low temperatures. It is resistant to corrosive liquids as it is chemically inert. A preferred material is polybutadiene. Other useful materials include polyisobutylene. These polymeric substances will form permanent adherence on the Teflon and metal surfaces. In a preferred embodiment of an adhesive according to this invention the sticky tacky materials have a viscosity ranging from over 50 c.p.s. to not more than 100,000 c.p.s. The sealing material may be a polymerizable substance which remains soft and tacky except when polymerized. One such substance is the polybutadiene referred to above. Polybutadiene is an unsaturated straight chain hydrocarbon. When exposed to air this material skims over, that is, further polymerizes. Thus, when this substance is used as a sealing material it remains soft and tacky except when exposed to air such as in the area of the exposed edge which turns rubbery but remains integral with the remainder of the sealing layer. Another satisfactory polymerizable substance is an unsaturated cyclic hydrocarbon identified by the name Velsicol sold by the Velsicol Corp., Chicago, Illinois. Polyisobutylene, on the other hand, is a saturated straight chain hydrocarbon which forms a tacky sealing layer. This substance does not further polymerize but forms a suitable sealing layer.

In a specific embodiment of this invention a pellet anode is created from a fine grain powder by being held together and sintered into a pellet having a density of about 8 grams per cubic centimeter. Any suitable wax or resin binder may be employed to cohere the particles together. An oxide is formed on this anode by passing a current through an electrolyte in contact with the anode resulting in the formation of $Ta_2O_5$ on the surface of the anode. This tantalum oxide coating is a dielectric in contact with an electrolyte of either lithium chloride or sulfuric acid. The silver can acts as a container and a cathode for the capacitor.

In FIG. 3 this invention is shown applied to a tantalum capacitor 22 having a wire anode 23. A capacitor 22 has an outer tubular can 24 of silver. The can 24 contains a paper tube 25, the wire anode 23 and a suitable electrolyte 26. The straight tantalum wire anode 23 has one end placed against a spacer disc 27 at one end of the can 24. The open end of the can 24 is closed by the same plugging means as described above in connection with FIG. 1. The plug 15, the gasket 16 and the adhesive layer 20 retain the electrolyte 26 in the can 24 in the same manner as described above in the embodiment of FIG. 1.

The pellet anode 12 is shown with a riser 28 extending into the center of the pellet. The riser 28 extends through the plug 15 and the gasket 16. The soft adhesive material is applied to the riser 28 to effect a sealing of the passage of the riser 28 through the plug 15 and the gasket 16. Similarly, the wire anode 23 extends through the plug 15 and the gasket 16 and the capacitor 22. The wire anode 25 is etched and soft adhesive was applied to the etch pits to substantially enhance the seal provided by the Teflon plug 15.

A riser 22 extends through the center of the pellet anode. The riser passes through the plug 15 and the gasket 16 to join a lead 23. Additional sealing means may be provided by applying the tacky adhesive to the riser 22 at its passage through the plug 15 and the gasket 16. This serves to enhance the seal of the plugging means.

The plug type seal of this invention provides a plug of Teflon which is relatively non-workable in a can of ductile metal. The can is interengaged into a cut groove in the Teflon plug. Among other advantages of this invention a seal is provided which holds the end closure of the can tight against the escape of the corrosive electrolyte during heat cycling of the capacitor. The soft adhesive adheres to the Teflon and the silver as they move with relation to each other. The plug type seal provides a solution to the sealing problem that can not be met by a soldered or welded or glass-to-metal seal, because of the difficulties involved in soldering or welding tantalum to any other film-forming metal, and because of the difference in expansion between tantalum and any known sealing glass. The seal of this invention utilizes the good vapor barrier characteristics of the Teflon and the corrosive resistance of the silver by affecting engagement of the two in such a manner as to avoid overworking or embrittlement of the silver and as to compensate for the relative inelasticity of the Teflon.

The soft adhesive of this invention has the ability to follow the contour of the interengagement of the silver and Teflon and to remain soft. The seal layer is a thin layer non-solid, permanently tacky and adherent to both the plug and the capacitor can wall. Thus, the seal layer combines the advantages of adherence to both the surfaces throughout heat cycling with thinness and at the same time functions as a plugging means between the plug and the can wall. When the soft adhesive is used as a sealant on the etched wire riser or the etched wire anode it is forced into the etch pits and clinging to these parts at their extension through the plug additionally seals the capacitor at this point.

When a pellet anode is used the seal of the capacitor as provided with the adhesive layer and the bottom spacer coact to accommodate large and small pellets without effect upon the electrical characteristics of the capacitor or a breaking of the seal. The top plug and the bottom cup coact to provide a clamping action which keeps the pellet under compression so that the pellet withstands shock and does not rotate or twist. The soft adhesive layer also cooperates with the elastomeric Kel-F gasket to provide a combination which preserves the seal of the capacitor through heat cycling. As noted above, an outstanding advantage of this capacitor construction is its low temperature characteristics.

This invention may be applied to tantalum anode capacitors in general. A tantalum capacitor having a conventional convolute capacitance section of wound tantalum foil and spacer ribbons may also be used with the plugging means of this invention. In this modification the conventional convolute capacitance section substantially completely fills a tube. Leads extend from the capacitance section at each end of the tubular end through Teflon plugs comparable to those described above in connection with the figures. The leads passing through the Teflon plugs may also be coated with the soft adhesive of non-polymerized hydrocarbon. The seal of the end of the cans by a combination of the Teflon plug and an adhesive layer is the same as described above in connection with the figures. These capacitors may be adequately sealed without the additional wafer of an elastomeric such as trifluorochloroethylene described above.

Various other modifications and substitutions may be made in some of the parts of the capacitor construction without departing from the spirit of this invention. For example, a silver coated copper can may be used for the pellet and wire anode units or a silver coated copper tube for the foil unit. Still other modifications in the specific embodiments described above will be readily apparent to those skilled in the art. The particular arrangements shown and described herein have been adopted for convenience and they may be varied without departing from the spirit of the invention. The scope of the invention is limited only by the following claims.

What is claimed is:

1. An electrolytic capacitor comprising a silver cathode container having an integral closed end, an inert spacer member within said container at said closed end, a pellet-type tantalum anode positioned on said spacer member, a corrosive electrolyte having an acid pH surrounding said anode in said container, a seal comprising a circumferentially grooved plug of essentially rigid halogenated ethylene polymer within said container external of said anode, a tacky hydrocarbon caulking material in said groove, said anode maintained between said plug and said spacer by the lip of said container being spun onto said seal, said capacitor sealed by the adjacent wall of said container being rolled into said groove whereby said caulking material maintains the seal upon differential expansion and contraction of said container and said plug.

2. An electrolytic capacitor comprising a silver cathode container having an integral closed end, an inert spacer member within said container at said closed end, a pellet-type tantalum anode positioned on said spacer member, a corrosive electrolyte having an acid pH surrounding said anode in said container, a seal comprising a circumferentially grooved plug of essentially rigid halogenated ethylene polymer within said container external of said anode, a tacky hydrocarbon caulking material in said groove, an elastomeric gasket within said container external of said plug, said anode maintained between said plug and said spacer by the lip of said container being spun onto said gasket, said capacitor sealed by the adjacent wall of said container being rolled into said groove whereby said caulking material maintains the seal upon differential expansion and contraction of said container and said plug.

References Cited in the file of this patent

UNITED STATES PATENTS

| | | |
|---|---|---|
| 1,352,650 | Blanchard | Sept. 14, 1920 |
| 2,199,446 | Ruben | May 7, 1940 |
| 2,535,945 | Menschik | Dec. 26, 1950 |
| 2,744,217 | Aikman | May 1, 1956 |
| 2,758,258 | Bliss | Aug. 7, 1956 |
| 2,851,642 | Schaeren | Sept. 9, 1958 |
| 2,871,426 | Hilton | Jan. 27, 1959 |

FOREIGN PATENTS

| | | |
|---|---|---|
| 481,114 | Great Britain | Mar. 4, 1938 |
| 772,555 | Great Britain | Apr. 17, 1957 |